US012415211B2

(12) United States Patent
Thornton

(10) Patent No.: US 12,415,211 B2
(45) Date of Patent: Sep. 16, 2025

(54) SYSTEMS AND METHODS FOR CONTROLLING ALGAL GROWTH INAIR CONDITIONING SYSTEMS

(71) Applicant: Kenneth R. Thornton, Rockledge, FL (US)

(72) Inventor: Kenneth R. Thornton, Rockledge, FL (US)

(73) Assignee: Kenneth R. Thornton, Rockledge, FL (US)

( * ) Notice: Subject to any disclaimer, the term of this patent is extended or adjusted under 35 U.S.C. 154(b) by 0 days.

(21) Appl. No.: 18/902,860

(22) Filed: Sep. 30, 2024

(65) Prior Publication Data

US 2025/0018450 A1 Jan. 16, 2025

Related U.S. Application Data

(63) Continuation of application No. 18/361,847, filed on Jul. 29, 2023, now abandoned.

(60) Provisional application No. 63/393,231, filed on Jul. 29, 2022.

(51) Int. Cl.
*B08B 17/02* (2006.01)
*F24F 13/22* (2006.01)

(52) U.S. Cl.
CPC ............ *B08B 17/02* (2013.01); *F24F 13/222* (2013.01); *F24F 2013/228* (2013.01)

(58) Field of Classification Search
None
See application file for complete search history.

(56) References Cited

U.S. PATENT DOCUMENTS 10,610,907 B1 * 4/2020 Scaringe ............... F24F 13/222
2020/0070217 A1 * 3/2020 Rose ..................... F24F 13/222

* cited by examiner

*Primary Examiner* — Eric W Golightly
(74) *Attorney, Agent, or Firm* — Accel IP Law, PLLC; Ferdinand M. Romano

(57) ABSTRACT

Systems and methods for controlling algal growth in a condensate drain line. In one embodiment a temperature value is acquired which is indicative of an ambient temperature about the drain line. One or more volumes of algaecide are calculated for injection one or more times per day into the drain line.

6 Claims, 7 Drawing Sheets

Flowchart of Algaecide Method

Fig. 1. Flowchart of Algaecide Method

Algae Growth vs Temperature

Air Conditioning System Overview, 46

Diagram of Dose and Interval at 25 C

Diagram of Dose and Interval at 15 C

Diagram of Algaecide Dosing System

Diagram of AC Power Scheme

Diagram of DC Power Scheme

Algaecide Dose over Temperature

SYSTEMS AND METHODS FOR CONTROLLING ALGAL GROWTH INAIR CONDITIONING SYSTEMS

RELATED APPLICATIONS

This application is a Continuation application of U.S. Ser. No. 18/361,847 filed on Jul. 29, 2023, and claims the benefit of the filing date of U.S. Provisional Patent Application Ser. No. 63/393,231, filed on Jul. 29, 2022, the entirety of which is incorporated herein by reference.

FIELD OF THE INVENTION

This invention relates generally to the field of air conditioning system maintenance and, more particularly, to devices and methods for controlling algal growth in air conditioning condensate drain lines.

BACKGROUND OF THE INVENTION

In humid conditions, air conditioning systems condense substantial amounts of water as air is cooled. Typically, the condensed moisture inside the air handler is gravity fed to a collection tray from which the water flows through a drain pipe which carries the condensate outside of the building being cooled.

The air conditioning cooling cycle often operates in high temperature, high humidity conditions. With condensate drain lines subjected to elevated humidity, they are subject to opportunistic algal growth and prone to clogging which can result in a water back-up. Because clogged drains can overflow with damaging consequences, some air conditioning systems are fitted with float switches to turn off the system when water in the drain line is in a backed-up state. Clogged condensate drains remain among the most common reasons for air conditioning system failures in the southeast region of the United States. A significant algae clog can require physical removal of debris followed by a chemical treatment. Clearing the drain may require professional cleaning.

It is not uncommon that residential air conditioning systems do not receive regular preventive maintenance. Cleaning is often a remedial measure taken after clogging rather than preventative. In the event of a clog, some homeowners might attempt to correct it, while others, not knowing the nature of the problem, may call in a repair service.

BRIEF SUMMARY OF THE INVENTION

According to embodiments of the invention, a method is provided that allows for low volume injection of algaecide into air conditioning condensate drains. In one embodiment the algaecide is pumped in predetermined doses or at calculated time intervals, wherein the net dose delivery may be a function of a temperature dependency of algae growth in order to limit or prevent algal growth or destroy algae. White vinegar (acetic acid), e.g., at a five percent concentration, may be applied as a suitable algaecide.

According to a method for controlling algal growth in a condensate drain line, a temperature value indicative of an ambient temperature about the drain line is acquired. A volume of algaecide is determined for injection one or more times per day into the drain line. Each injection may be a volumetric calculated dose based on an acquired temperature value. One or more injections may be applied to reduce the rate of algal growth in the condensate drain line. Multiple volumes of algaecide may be injected into the drain line during a one day period.

In another embodiment a method is provided for controlling algal growth in a condensate drain by acquiring and storing temperature values over a series of time intervals. A temperature value is determined based on a combination of the stored temperature values. A volumetric algaecide dose is determined based on the combination of the stored temperature values. The method may include injecting a plurality of the volumetric algaecide doses into the drain line during a one day period.

An apparatus is also provided for controlling algal growth in a condensate drain line, wherein a device provides temperature data at a location for which the temperature data is representative of an ambient temperature near the drain line. A processing unit is connected to receive the temperature data and is configured to calculate doses of algaecide with the temperature data for injection into the drain line. A pumping system is configured to inject variable doses of algaecide into the drain line wherein dose volumes are based on calculations performed by the processing unit. In one embodiment the device measures an ambient temperature near the drain line. In another embodiment the device comprises electronic interface circuitry through which temperature data is received into the processing unit. The temperature data may be representative of ambient temperature about the drain line. The electronic interface circuitry may include electronics for receiving the temperature data from a remote source through the internet or via a Wi-Fi link. The remote source may provide location specific temperature data based on postal codes, physical address information of other location information.

In still another series of embodiments an apparatus is provided for controlling algal growth in a condensate drain line. A processing unit may be connected to receive the temperature data from a device and be configured to calculate doses of algaecide to individually inject doses into an air conditioning condensate drain line based on the temperature data. A pumping or injection system may be configured to inject doses of algaecide into the drain line based on one or more dose calculations performed by the processing unit. In some embodiments the pumping system is configured to inject variable doses of algaecide into the drain line. The variable doses may be implemented by pump-on and pump-off durations.

Advantages and features of the present invention will become apparent from the following description and the accompanying drawings which describe an example embodiment of the present invention.

In some embodiments, the net amount of algaecide delivery is dependent on the temperature under which the algal growth occurs. The following sequence of steps is exemplary:

1) Monitoring ambient temperature.

2) Calculating an algaecide net dose to be periodically injected into a drain line.

3) Delivering the calculated dose of algaecide for the most current period of acquired temperature data.

4) Repeating steps 1, 2, and 3.

A feature of embodiments of the invention is provision of a net delivery of algaecide as a function of temperature such that the dose, or the dose interval, or both, can be varied. An exemplary relationship between the net algaecide dose and algal growth temperatures will become apparent from the following description of one embodiment.

BRIEF DESCRIPTION OF THE FIGURES

The drawings illustrate an exemplary embodiment of the invention. The figures may not be drawn to scale such that various aspects of the invention may be more clearly shown to facilitate understanding of the invention, wherein.

In accord with common practice, various ones of the described features may not be drawn to scale, to emphasize specific features relevant to the invention.

DETAILED DESCRIPTION OF THE INVENTION

Figure 3:
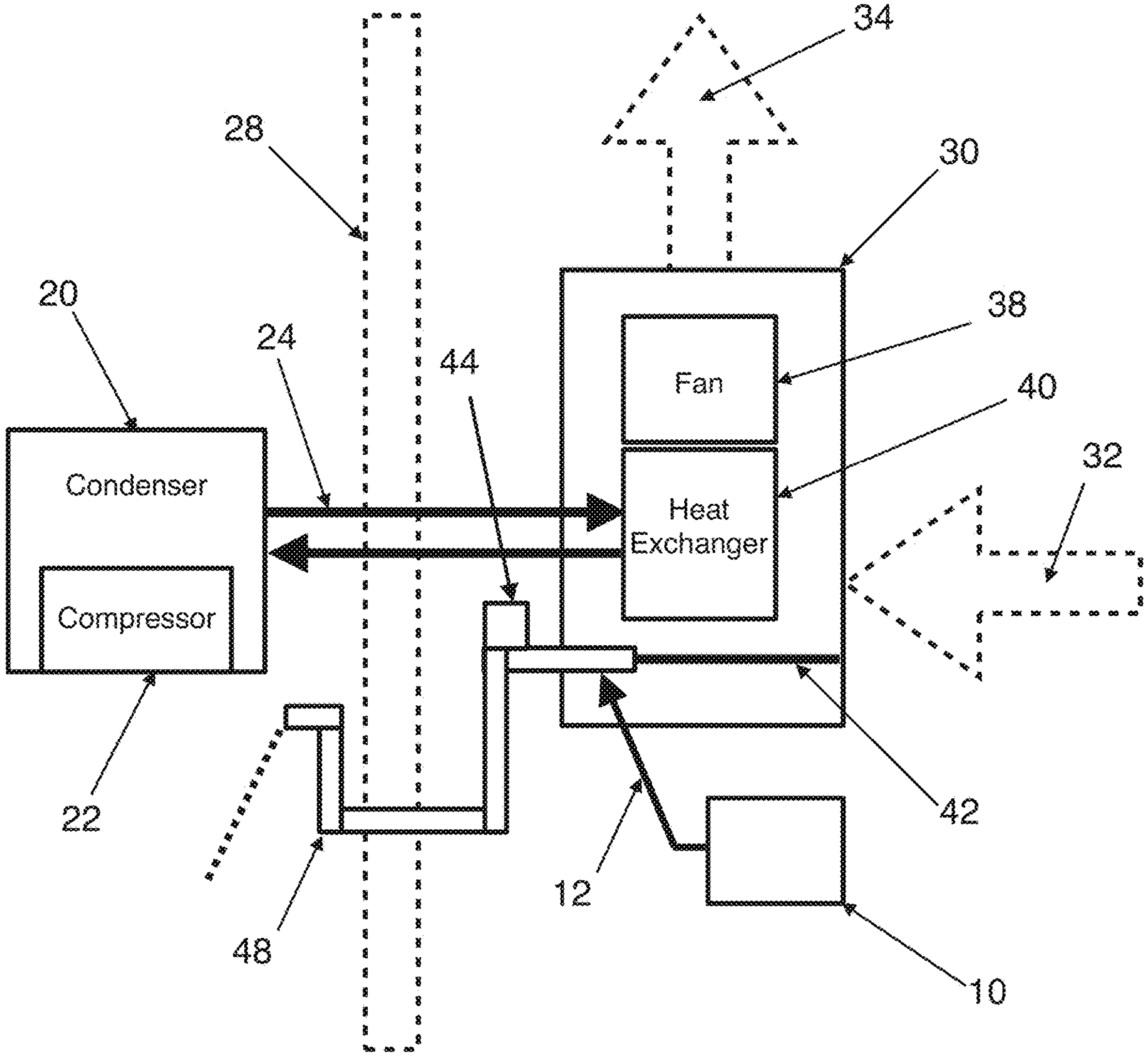
PRIOR ART Fig. 3
FIG. 3 illustrates components of an Air Conditioning System.

Exemplary embodiments of a system and a method according to the invention are now described. In FIG. 3 there is shown a diagram of a typical residential central air conditioning system. The compressor 22 and condenser 20 lower the temperature of the refrigerant 24 which is sent through the exterior wall 28 of a residence to the heat exchanger 40 of an air handler 30. Warm air 32 is drawn through the heat exchanger 40 by the fan 38 and chilled air 34 is expelled to cool the interior. When the air conditioner is operating, condensate from the heat exchanger 40 falls on to the condensate tray 42 and is gravity fed through the condensate drain 48. In the event of a blockage in the drain 48, the condensate will back up and raise the float switch 44, switching off the air conditioner.

With respect to temperature, the air handler 30 is subject to the residential interior air temperature. In the case of a thermostat set to the federally recommended value of 78° F. the inside air will vary according to the thermostat hysteresis, typically 1° F., giving an operating range of 77 to 79° F., which may be an optimum temperature for algal growth. When operating, the heat exchanger 40 will be much cooler and hence below the algae growth range. Similarly, any condensate falling on to the tray 42 may be too cold at that point to support algae. As the water moves along the drain 48, the temperature gradient ranges from that of the ambient air outside the drain 48 to the condensate temperature inside. In between these two temperatures lies an ideal range for algal growth. There are many types of algae but those of particular concern are the variety that constitute a nuisance by thriving in low light level and elevated temperature conditions typical of A/C drains.

Figure 4A:
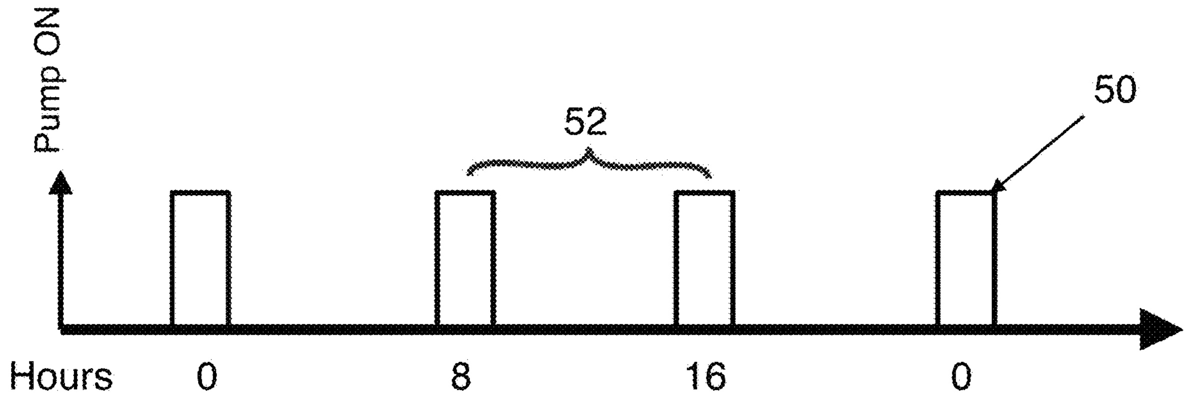
FIGS. 4A and 4*b* illustrate Dose Volumes and Intervals at differing temperatures.
Figure 4B:
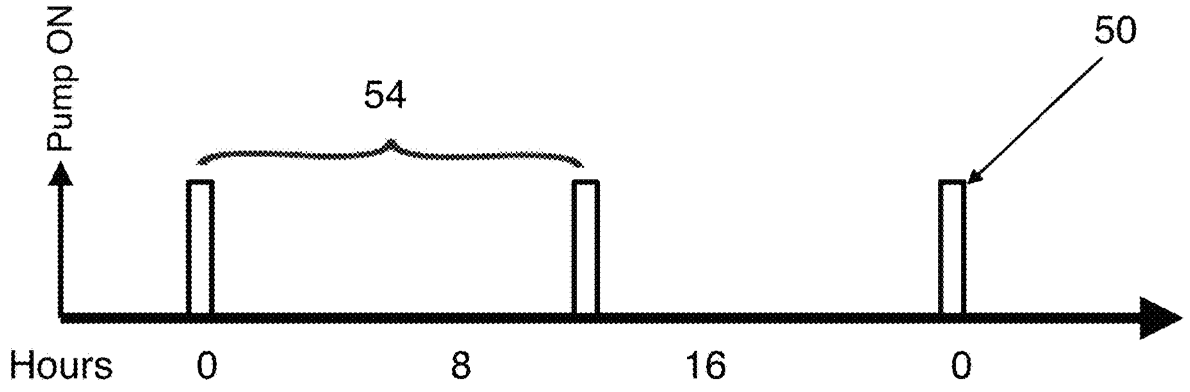
Figure 5A:
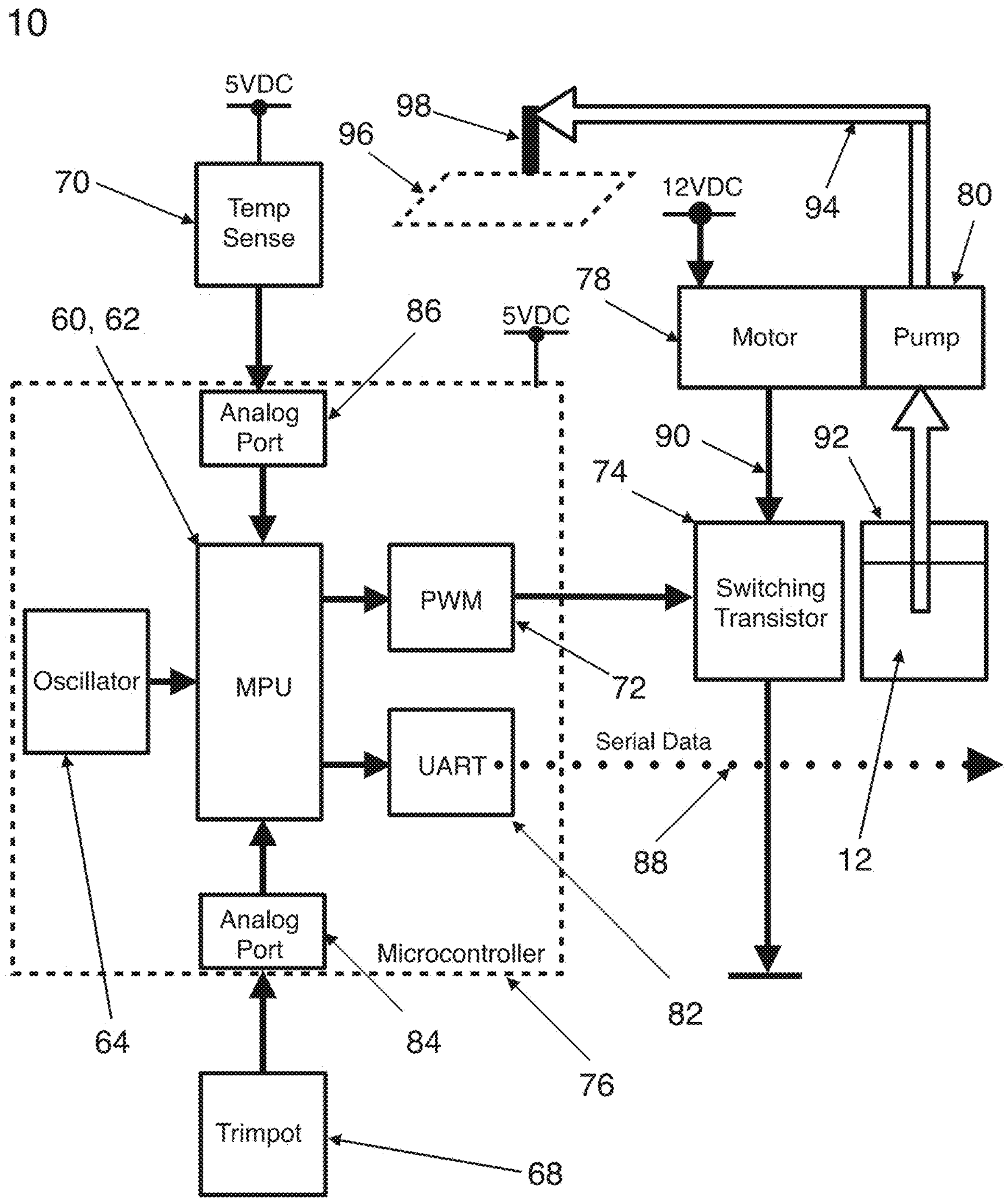
FIGS. 5*a*-5*c* illustrate embodiments of the Algaecide Delivery System having AC or DC power inputs.
Figure 5B:
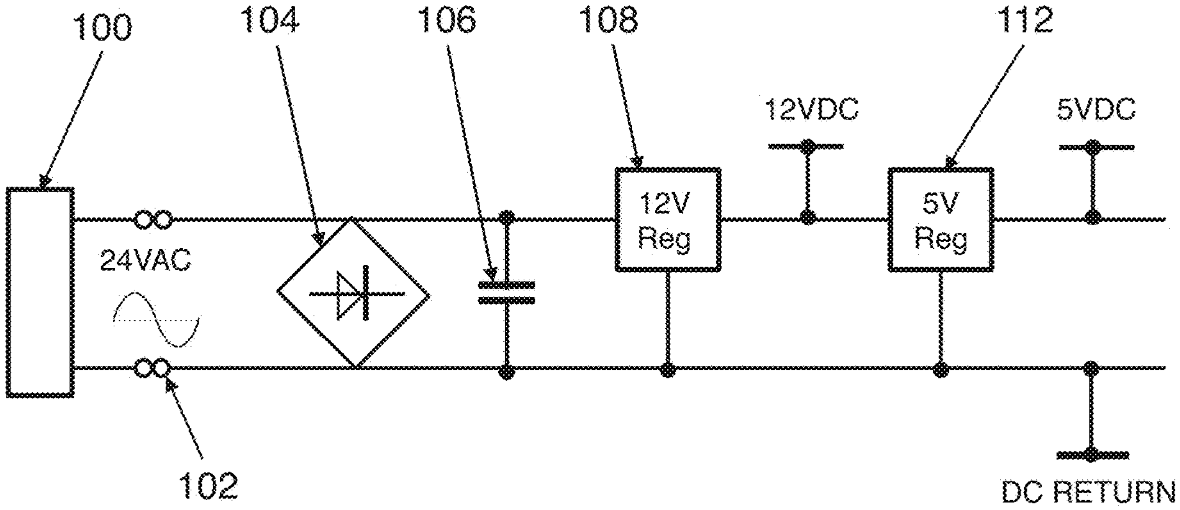
Figure 5C:
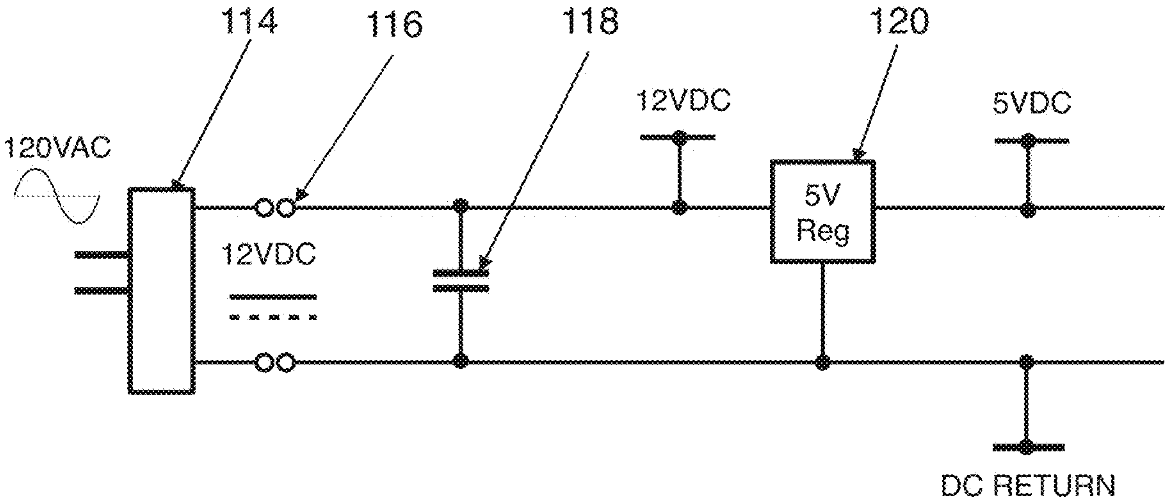

FIG. 5A shows the internal components of the Algaecide Delivery System 10, which is powered by one of the AC or DC power schemes described in FIGS. 5B and 5C. The microcontroller 76 reads the analog input 86 hourly to obtain the ambient air temperature local to the Algaecide Delivery System from sensor 70. Alternatively, the microcontroller can obtain the temperature from a remote sensor or local weather website. After 8 hours the microcontroller reads the user-adjustable trimpot 68 to determine whether the user has changed the designated dose. The user dose setting of 68 and the maximum temperature of the previous 8 hours are used as described in FIG. 1 to derive the algaecide dose as a function of temperature. The dose is realized by switching on an algaecide pump 80 for longer or shorter times as described in FIG. 4 and the result is a variable algaecide dose illustrated in FIG. 6.

Figure 6:
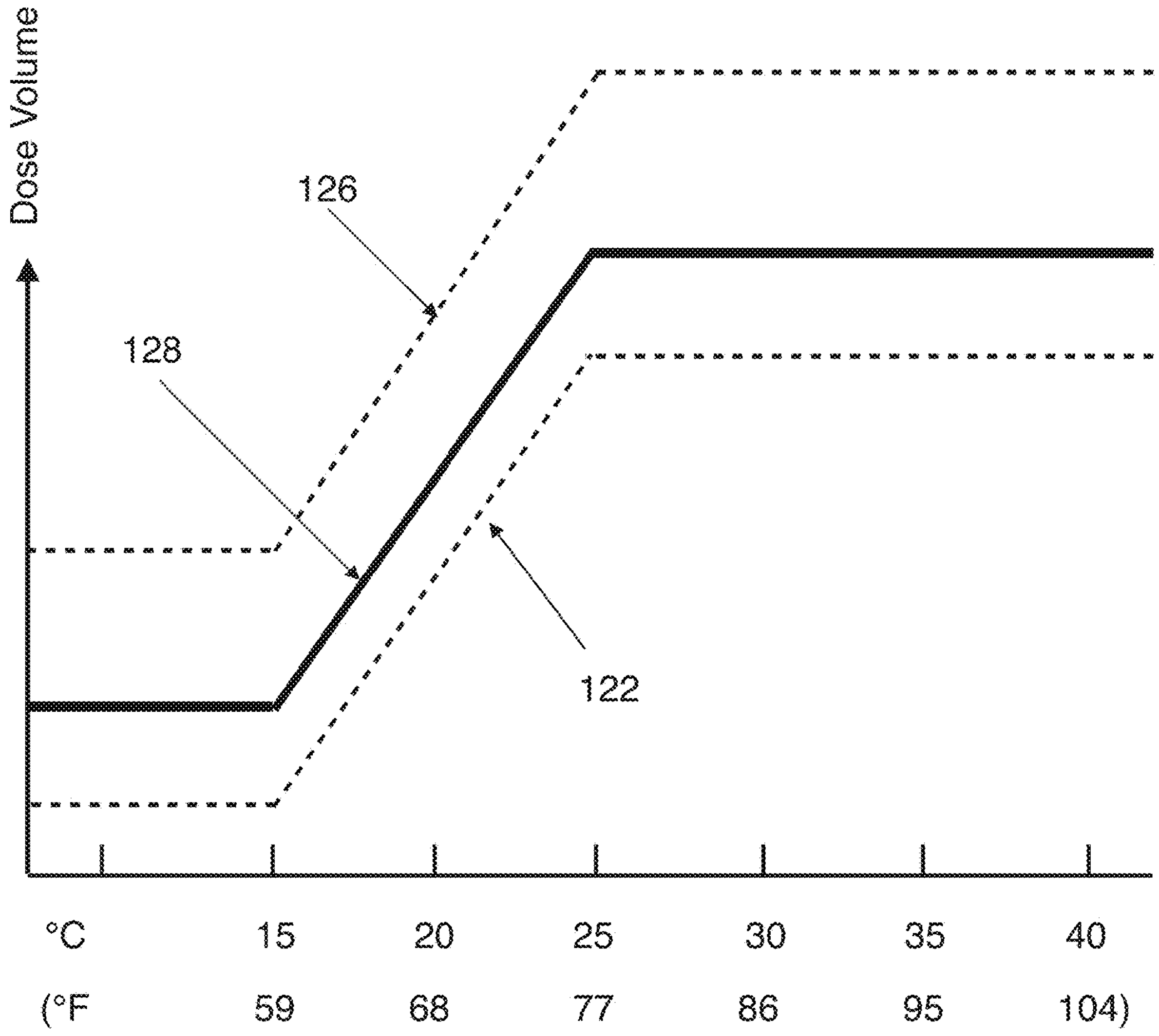
FIG. 6 qualitatively illustrates exemplary changes in algaecide dosing as a function of ambient temperature.

The MPU performs the following operations to vary dose according to temperature:

1. The user setting on trimpot 68 is increased or decreased to vary the dose volume from the exemplary default of 1 milliliter every 8 hours. In the example, the dose volume is determined by pump run time.
2. If the maximum temperature is above 26 C the dose is maintained as shown in FIG. 6.
3. If the maximum temperature is below 26 C, that temperature value is subtracted from 26 to give a temperature delta value.
4. The temperature delta value is used to proportionately reduce the pump run time and hence dose volume. The temperature delta value is multiplied by a constant and the result is subtracted from the current pump run time. As temperature reduces, pump run time reduces and hence dose volume reduces.
5. If the temperature is below 15 C, the pump run time is maintained to deliver one third of the user set value.

Figure 1:
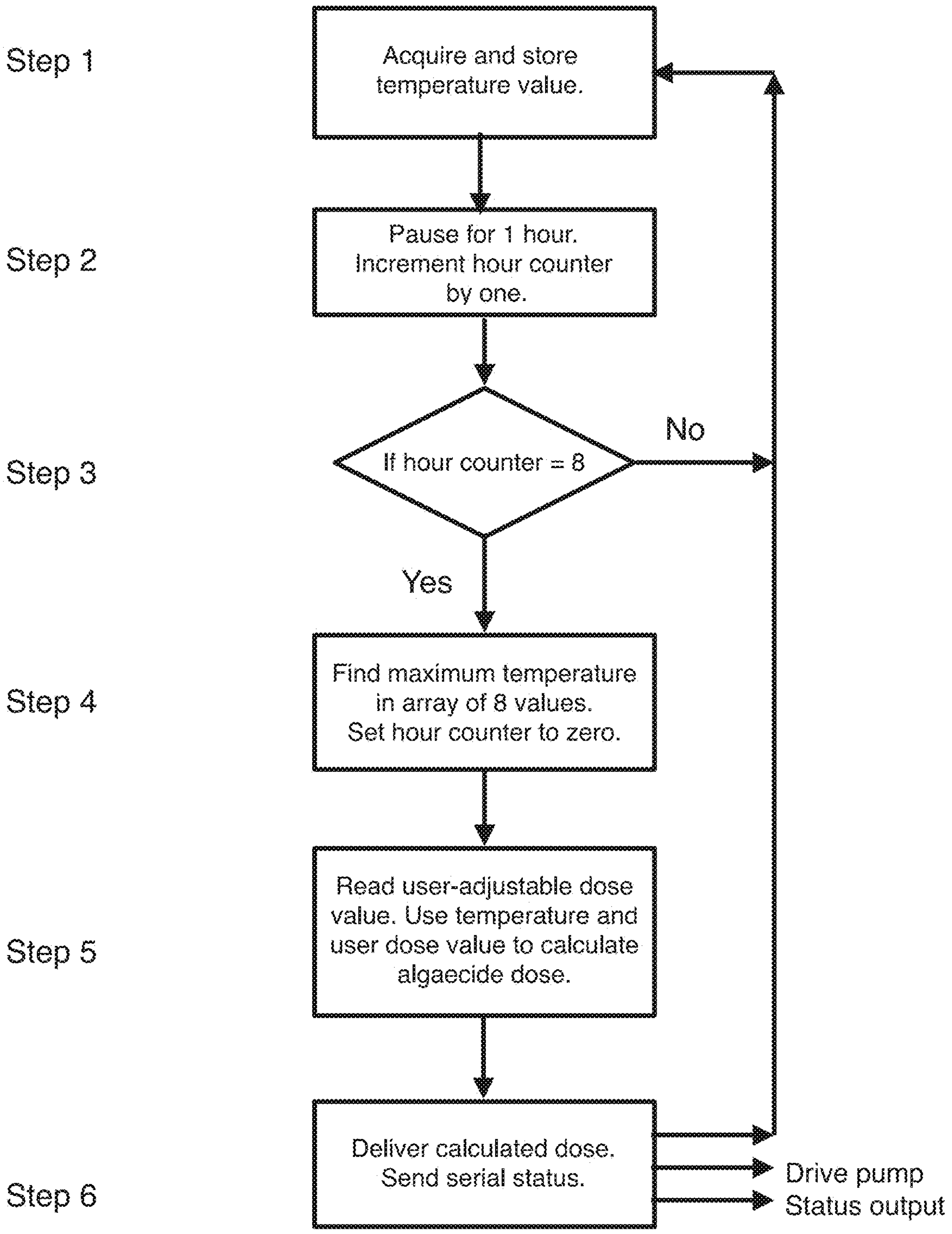
FIG. 1 illustrates an exemplary flow chart of an Algaecide System for a program running on a microcontroller.

Referring to the Algaecide Delivery System 10 of FIGS. 5, the flowchart of FIG. 1 illustrates a sequence of method steps according to which an algaecide dose is delivered as a function of ambient temperature. Timing intervals and time values are illustrative only. According to this embodiment the highest temperature in an arbitrary period, in this case over an 8-hour period, is determined and the algaecide dose is calculated based on that peak temperature. In accord with the flowchart of FIG. 1, a program 60 running on a microcontroller CPU core 62 in the Algaecide Delivery System 10 operates as follows.

Figure 2:
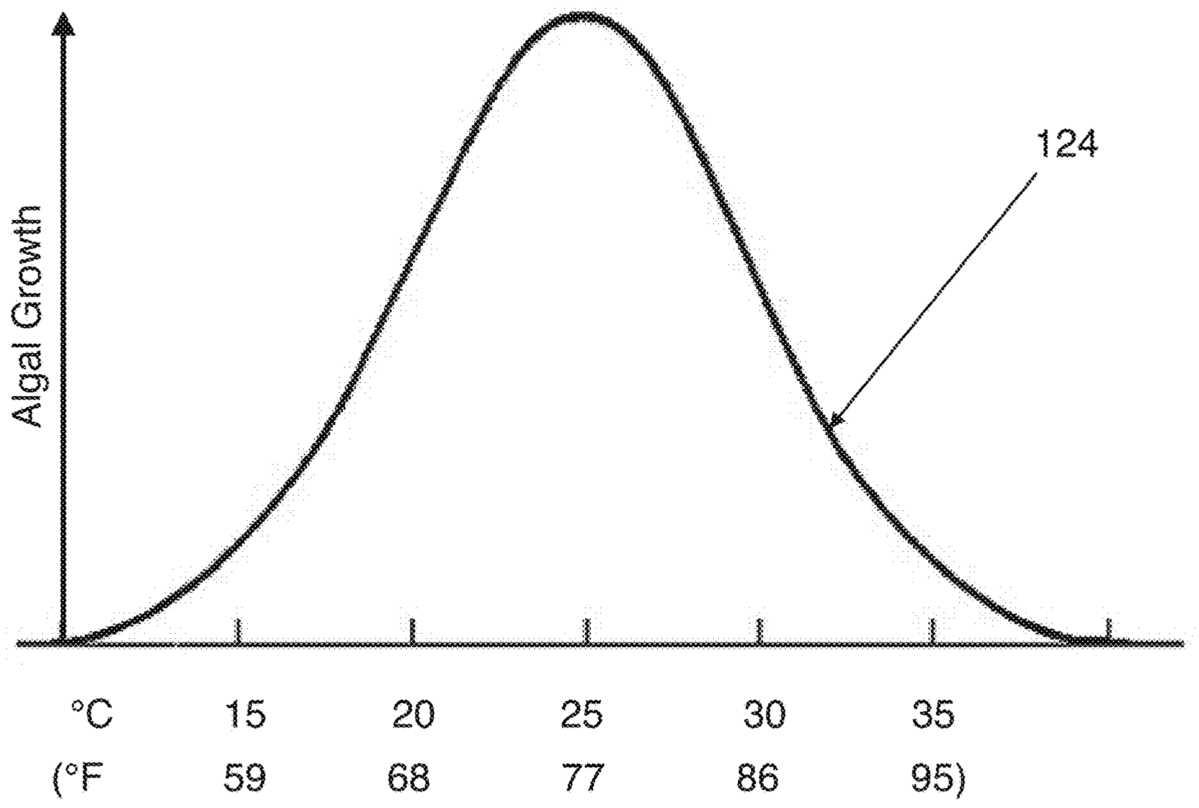
PRIOR ART Fig. 2
FIG. 2 graphically depicts a relationship between Algal Growth Rate and Temperature.

In step 1 the program 60 obtains the ambient temperature from sensor 70 or by other means such as from a remote sensor or a weather website and writes the temperature value to an array. In step 2 the program 60 pauses for a predetermined time interval, e.g., an hour. After the pause interval the program 60 increments the nominal hour count which value in this instance also serves as the array pointer. In step 3 the program 60 compares the hour count to the array size, in this instance eight. If the count is less than eight the program 60 repeats steps 1, 2, and 3 until the hour count reaches 8. When the hour count is eight the program 60 moves to step 4, resets the hour count to zero and sorts the array to find the maximum temperature in the preceding 8-hour time period. The example embodiment includes in FIG. 5A trimpot user setting to allow the user to adjust the dose with the trimpot 68. In step 5 the program 60 reads the trimpot voltage output via an A/D converter 84. The program 60 uses the temperature reading from sensor 70 and the user dose setting from trimpot 68 of FIG. 5A in FIG. 1, Step 5 to calculate or optimize the algaecide delivery against the algal growth range as shown in FIG. 2. In this example, the system 10 delivers a dose during every 8-hour cycle based on the dose that corresponds to the maximum temperature recorded during that cycle. In the case of an eight hour cycle there can be three injected doses per day. For example, (i) a first cycle may provide a highest dose based on the maximum daytime temperature (typically mid afternoon) and therefore a highest daily dose, and (ii) a second cycle may provide a lowest daily dose based on a highest nighttime temperature, resulting in a lowest dose, and (iii) a third eight hour cycle may provide an intermediate daily dose based on the maximum hourly temperature during the third eight hour period of the day to provide an intermediate dose.

In this invention it can be seen that the dose amounts are not based on time but, rather, on the approximately sinusoidal temperature cycles of optimal algal growth. A feature of the invention is that the volumetric size of the algaecide dose may be based on the optimal algal growth rate as a function of temperature and is not merely a constant delivery at regular intervals.

In step 6 the program drives the pump to deliver a calculated dose for each period, e.g., 8 hours. Also in step 6, the invention may transmit by well-known means status information including but not limited to the ambient temperature values and dose values. That information may, for example, be sent to an electronic data collection device forming part of a system such as telemetry, a Smart Home, or Internet of Things.

FIG. 2 illustrates a generalized graph for a typical growth rate 124 of algae as a function of temperature. While not specific to air conditioning condensate drains, useful algae growth rate data is generally available.

It can be seen from FIG. 2 that maximum algal growth occurs around the Gaussian peak of 25° C., with significant growth between 2° and 30° C. (68-86° F.). Above 30° C. there is considerable temperature stress in the target algae, but, because air conditioning drains are subject to an intermittent cooling during condensate flow. Condensate flow rate also increases with temperature. The condensate flow rate will be greater and occur more often when the air conditioner is running in hot and humid conditions, not only reducing the temperature stress but stabilizing the temperature for optimal algae growth. Thus, the in situ algal growth rate may be greater than that based on the ambient temperature readings and the dose may be modified accordingly.

FIGS. 4A and 4B illustrate example dosing treatments under high temperature conditions and low temperature conditions, respectively. The x-axis indicates lapsed time, and the y axis indicates pump on-off periods or dose via PWM. The algaecide dose amount varies with temperature as shown in FIGS. 4A and 4B. In one embodiment, the actual net dose amount is affected by varying the length of pump on-off periods while the pump is running at a fixed speed. In other embodiments, the dose amount may also be achieved by varying the pump motor speed, or the pump interval.

In both the high temperature level and low temperature level examples of FIGS. 4A and 4B, the pump is switched to an on-period 50 for a calculated length of time that may be a function of algal growth temperature. Further, it can be seen that the interval between doses 52 (high temperature) and 54 (low temperature) may also be varied with temperature. The result of this embodiment of the method is that the calculated net dose amount can be effectively increased at higher optimal algal growth temperatures and reduced at lower temperatures.

As an example, shown in FIG. 4A, in one embodiment the controller might be set to a pump on-period 50 to result in a calculated dose of 1 ml of algaecide during every 8 hour interval 52 (see FIG. 4A), e.g., when the temperature is at 25° C. During lower nighttime and winter temperatures the dose may be reduced by decreasing the pump on-period 50 or by increasing the interval 54 between pump on-periods 50. Thus the dose may be increased or decreased such as, for example, the period shown in FIG. 4B because the algal growth rate is temperature dependent and thereby more limited at lower temperatures. With the invention the corresponding algaecide dose amount may be reduced by shortening the pump on-period 50 and/or increasing the dose interval 54. The dose in this example would be proportionately reduced against temperature to a low maintenance value of, say, 0.3 ml.

An advantage of this embodiment of the invention is that targeting optimal algal growth temperatures specifically addresses the nuisance of algae. Further, a reduced dose amount and/or longer dose interval at temperatures not supporting algal growth reduces cost, lowers stress on the equipment, and lessens the environmental impact of the algaecide.

Turning again to the dosing system 10 of FIGS. 5, a program 60 running on the microcontroller MPU core 62 uses the oscillator block 64 to provide MPU cycles and timing. The values of user-adjustable dose trimpot 68 and the temperature sensor 70 are read as analog inputs 84, 86 to an internal algorithm component of the program 60 to determine the algaecide dose amount as a function of temperature. To this end, the MPU 62 instructs the PWM cell 72 to drive the pump motor 78. This is affected by means of an external high current transfer device such as a relay or switching transistor 74 pulling current 90 through the motor 78. The motor 78 drives the pump 80 which pumps the algaecide 12 from the holding tank 92. The pump algaecide output is distributed along flexible tubing 94 into the A/C condensate drain 96 using the screw adapter 98.

There are provided in FIGS. 5B and 5C alternative power schemes for the embodiment illustrated in FIG. 5A. In FIG. 5B the dosing system 10 draws power from the 24 volt alternating current output of the air handler control transformer 100 wired to terminals 102. This AC voltage is turned into direct current by the bridge rectifier 104 and smoothed by the capacitor 106. The resulting voltage (35 to 40 VDC) is downshifted to 12 VDC for the pump by the regulator 108, and further reduced to 5 VDC by the regulator 112 to power the dosing system logic of FIG. 5A.

In FIG. 5C the dosing system 10 draws power from a 12 VDC external power adapter 114. The DC power is plugged into the exemplary dosing system embodiment using the DC barrel connector 116. Smoothing is provided by capacitor 118. The nominal 12 VDC is provided directly to the pump. The regulator 120 outputs 5 VDC for the dosing system logic of FIG. 5A.

Optionally, the microcontroller 62 of FIG. 5A may send status information, in the form of serial data using the UART cell 82 or, alternatively, as GPIO software bit-bashed status information for use in telemetry or Internet of Things applications. In one embodiment the pump 80 is a positive displacement device such as a peristaltic or diaphragm pump allowing for a repeatable dispensed volume and preventing siphoning. The microcontroller 62 adjusts the dispensed dose by varying the motor on-time 50, the intervals between motor-on intervals 52 or 54, or by varying the speed of the motor 78 using the PWM cell 72.

The resulting dose injected as a function of temperature is illustrated in FIG. 6. The solid black line 128 represents the default algaecide dose response to temperature, while the dotted lines represent the approximate low 122 and high 126 extents of adjustability as defined by the user adjustments in dose via the trimpot 68 shown in FIG. 5A.

For the disclosed embodiments it may be preferred that the dose not go to zero at low temperatures. A small maintenance dose may be continued through periods of cold weather to discourage other growth, infestation, or to lower the freezing point. The freezing point at normal (5%) acetic acid concentrations of white vinegar is −2° C. The maximum dose is sustained at elevated temperatures as increased condensate flow compensates for algal temperature stress at higher ambient temperatures.

One or more example embodiments of an apparatus and methods have been illustrated. The illustrated embodiments have been described to provide understanding of inventive concepts and underlying principles. It will be recognized by those skilled in the art that the concepts and principles of operation can be readily modified and extended to create other apparatus designs and methods providing enhanced performance and functionality to mitigating algal growth. Thus while the invention has been described in connection with one embodiment, the scope of the invention is not so limited and includes alternatives, modifications, and equivalents as will be apparent to those persons skilled in the art.

Accordingly, the scope of the disclosure is only limited by the claims which follow with each claim describing an embodiment while still other embodiments may combine features recited in different claims. Combinations of different embodiments are within the scope of the claims and will be apparent to those of ordinary skill in the art after reviewing this disclosure.

The claimed invention is:

1. A method for controlling algal growth in a condensate drain line, the method comprising:

measuring and storing temperature values, indicative of ambient temperature about the drain line, over a series of time intervals;

determining one or more calculated temperature values each based on a combination of stored temperature values; and calculating one or more volumetric algaecide doses based on one or more combinations of the stored temperature values for injection one or more times into the drain line during a time period.

2. The method of claim 1 further including providing one or more injections into the drain line based on said one or more calculated doses to reduce the rate of algal growth in the condensate drain line.

3. The method of claim 2 wherein multiple volumes of algaecide are injected into the drain during a one day period.

4. The method of claim 3 wherein multiple different volumes of algaecide are injected into the drain line during a one day period.

5. The method of claim 1 wherein the time period is a day.

6. The method of claim 5 further including injecting a plurality of the volumetric algaecide doses into the drain line during a one day period.

* * * * *